United States Patent
Issa et al.

(10) Patent No.: US 7,715,586 B2
(45) Date of Patent: May 11, 2010

(54) REAL-TIME RECOMMENDATION OF ALBUM TEMPLATES FOR ONLINE PHOTOSHARING

(75) Inventors: Alfredo C. Issa, Apex, NC (US); David Greene, Cary, NC (US)

(73) Assignee: Qurio Holdings, Inc, Raleigh, NC (US)

( * ) Notice: Subject to any disclaimer, the term of this patent is extended or adjusted under 35 U.S.C. 154(b) by 846 days.

(21) Appl. No.: 11/201,594

(22) Filed: Aug. 11, 2005

(65) Prior Publication Data

US 2007/0064121 A1    Mar. 22, 2007

(51) Int. Cl.
G06K 9/00    (2006.01)
G06F 17/30    (2006.01)

(52) U.S. Cl. .......................................... 382/100; 707/10

(58) Field of Classification Search ................. 382/100; 707/10

See application file for complete search history.

(56) References Cited

U.S. PATENT DOCUMENTS

| | | | |
|---|---|---|---|
| 6,035,323 A | 3/2000 | Narayen et al. .............. 709/201 |
| 6,202,061 B1 | 3/2001 | Khosla et al. .................. 707/3 |
| 6,324,545 B1 | 11/2001 | Morag ........................ 707/202 |
| 6,389,181 B2 | 5/2002 | Shaffer et al. |
| 6,487,583 B1 | 11/2002 | Harvey et al. ................ 709/204 |
| 6,519,629 B2 | 2/2003 | Harvey et al. ................ 709/204 |
| 6,577,311 B1 | 6/2003 | Crosby et al. ................ 345/428 |
| 6,629,100 B2 | 9/2003 | Morris et al. .................. 707/10 |
| 6,629,104 B1 * | 9/2003 | Parulski et al. .............. 707/102 |
| 6,633,850 B1 | 10/2003 | Gabbard et al. |
| 6,636,648 B2 | 10/2003 | Loui et al. .................. 382/284 |
| 6,646,754 B1 | 11/2003 | Redd et al. |
| 6,704,797 B1 | 3/2004 | Fields et al. |
| 6,741,864 B2 | 5/2004 | Wilcock et al. .......... 455/456.1 |
| 6,757,684 B2 | 6/2004 | Svendsen et al. .............. 707/10 |
| 6,888,569 B2 * | 5/2005 | Fox et al. .................... 348/239 |
| 6,891,635 B2 | 5/2005 | Dutta |
| 7,062,572 B1 | 6/2006 | Hampton |
| 7,197,707 B2 * | 3/2007 | Cicchitelli et al. .......... 715/269 |
| 7,266,563 B2 * | 9/2007 | Morris et al. ................ 707/102 |
| 7,286,723 B2 * | 10/2007 | Taugher et al. .............. 382/305 |
| 2001/0039520 A1 | 11/2001 | Nakade et al. |
| 2001/0052997 A1 | 12/2001 | Satake et al. |
| 2002/0109729 A1 | 8/2002 | Dutta |
| 2002/0194590 A1 | 12/2002 | Pong |
| 2003/0001903 A1 | 1/2003 | Duffy |
| 2003/0051255 A1 | 3/2003 | Bulman et al. .............. 725/135 |
| 2003/0063770 A1 | 4/2003 | Svendsen et al. ............ 382/100 |
| 2003/0154178 A1 | 8/2003 | McIntyre et al. |
| 2003/0236831 A1 | 12/2003 | Ortiz et al. |
| 2003/0236832 A1 | 12/2003 | McIntyre et al. |
| 2004/0003117 A1 | 1/2004 | McCoy et al. |
| 2004/0024828 A1 | 2/2004 | Miyagi et al. |
| 2004/0117258 A1 | 6/2004 | Kanbura |

(Continued)

*Primary Examiner*—Samir A Ahmed
*Assistant Examiner*—Li Liu
(74) *Attorney, Agent, or Firm*—Withrow & Terranova, PLLC

(57) ABSTRACT

The present invention provides a system and method for recommending templates for electronic or online photo albums. In general, digital images are selected to form a photo album. The metadata associated with the digital images is analyzed to provide selection criteria. Using the selection criteria, one or more templates are selected from a template database as recommended templates. One of the recommended templates is selected and applied to the photo album.

29 Claims, 9 Drawing Sheets

U.S. PATENT DOCUMENTS

| | | | |
|---|---|---|---|
| 2004/0172419 A1* | 9/2004 | Morris et al. | 707/200 |
| 2004/0205168 A1 | 10/2004 | Asher | 709/220 |
| 2004/0207657 A1 | 10/2004 | Svendsen | |
| 2004/0215523 A1 | 10/2004 | Wulff et al. | |
| 2004/0215625 A1* | 10/2004 | Svendsen et al. | 707/10 |
| 2004/0230966 A1* | 11/2004 | Morris et al. | 717/169 |
| 2005/0021624 A1 | 1/2005 | Herf et al. | 709/204 |
| 2005/0052685 A1 | 3/2005 | Herf et al. | 358/1.15 |
| 2005/0111737 A1 | 5/2005 | Das et al. | |
| 2005/0114711 A1 | 5/2005 | Hesselink et al. | |
| 2005/0171864 A1 | 8/2005 | Nakade et al. | |
| 2005/0182649 A1* | 8/2005 | Parulski | 705/1 |
| 2005/0289111 A1* | 12/2005 | Tribble et al. | 707/1 |
| 2006/0041591 A1 | 2/2006 | Rhoads | |
| 2006/0080286 A1* | 4/2006 | Svendsen | 707/3 |

* cited by examiner

REAL-TIME RECOMMENDATION OF ALBUM TEMPLATES FOR ONLINE PHOTOSHARING

FIELD OF THE INVENTION

The present invention relates to online photosharing and more particularly relates to real-time recommendation of album templates for online photosharing.

BACKGROUND OF THE INVENTION

Digital cameras have become commonplace over the past several years. Digital camera users often desire to share digital images with family and friends. Because it is impractical to print copies of the digital images for every family member and friend who may desire a copy of the images, the digital images are shared using various electronic means such as e-mail and online photosharing services. However, many e-mail servers impose limits on the size of attachments. Thus, a user must typically resize the digital images prior to sending them via e-mail. However, by resizing the digital images, the digital images may no longer be suitable for printing by the recipient.

To accommodate the need for sharing full resolution digital images, numerous online photosharing services have emerged and are becoming widely accepted by photo enthusiasts. As an example, QURIO® photosharing software is a peer-to-peer (P2P) photosharing and photoediting software tool that allows a user to create and store photo albums on the user's computer. The user's computer then operates as a web server, and the user may invite any number of guests to view the photo albums. The guests may also be permitted to download full resolution images from the user's computer.

One issue with typical photosharing services is that the photo albums simply place the digital images in some standard template. Because user's desire to customize their photo albums, some photosharing services allow a user to manually customize features such as the background color and font used for the photo album. However, the user must spend a significant amount of time and possibly be required to have knowledge of HTML code to make these customizations. Thus, there remains a need for a system and method for creating an online photo album that allows a user to quickly and easily customize the photo album.

SUMMARY OF THE INVENTION

The present invention provides a system and method for recommending templates for electronic or online photo albums. In general, digital images are selected to form a photo album. The metadata associated with the digital images is analyzed to provide selection criteria. Using the selection criteria, one or more templates are selected from a template database as recommended templates. One of the recommended templates is selected and applied to the photo album.

In one embodiment, the present invention is implemented on a single computer where the template database may reside locally on the single computer or reside on a remote server accessible via a network. In another embodiment, the present invention may be implemented in a photosharing network where the photo album or the photo album and the digital images are hosted on a central server. The template database may reside on the central server or on another central server that is accessible via a network.

In a third embodiment, the present invention may be implemented in a peer-to-peer (P2P) photosharing system. The system includes a central server having a recommendation engine and a template database and one or more remote nodes. A photo album is created on a remote node. When it is desired to obtain recommended templates, metadata associated with digital images included in the photo album is sent to the recommendation engine. The recommendation engine receives the metadata and selects templates from the template database to recommend for the photo album based on an analysis of the metadata. A preview of the recommended templates is provided to the remote node and a desired one of the recommended templates is selected and optionally purchased. Thereafter, the peer node applies the desired template to the photo album.

In one embodiment, the recommendation engine performs a statistical analysis of the metadata in order to select templates to recommend for the photo album. The statistical analysis may include determining a mean, median, or mode for one or more variables such as shutter speed, wherein the metadata includes a value for each of the variables for each of the digital images in the photo album. In another embodiment, the recommendation engine is an inference engine that selects templates to recommend for the photo album based on historical data. In this embodiment, the inference engine recommends templates selected in the past for photo albums having similar metadata.

In yet another embodiment, the recommendation engine analyzes the metadata to determine dates upon which the digital images were captured, times at which the digital images were capture, and/or a location at which the digital images were captured. The recommendation engine may then select templates to recommend for the photo album based on the dates, times, and/or location.

In yet another embodiment, the recommendation engine analyzes the metadata to search captions associated with the digital images and stored in the metadata for predetermined keywords. The captions may be text or audio captions. Templates may then be recommended based on one or more of the keywords found in the captions associated with the digital images in the photo album.

Those skilled in the art will appreciate the scope of the present invention and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the invention, and together with the description serve to explain the principles of the invention.

DETAILED DESCRIPTION OF THE PREFERRED EMBODIMENTS

The embodiments set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The present invention provides a system and method for recommending templates for an online photo album. In general, digital images are selected to form a photo album. The metadata associated with the digital images is analyzed to provide selection criteria. Using the selection criteria, one or more templates are selected from a template database as recommended templates. One of the recommended templates is selected and applied to the photo album. In one embodiment, the present invention is implemented on a single computer where the template database may reside locally on the single computer or reside on a remote server accessible via a network.

Figure 1:
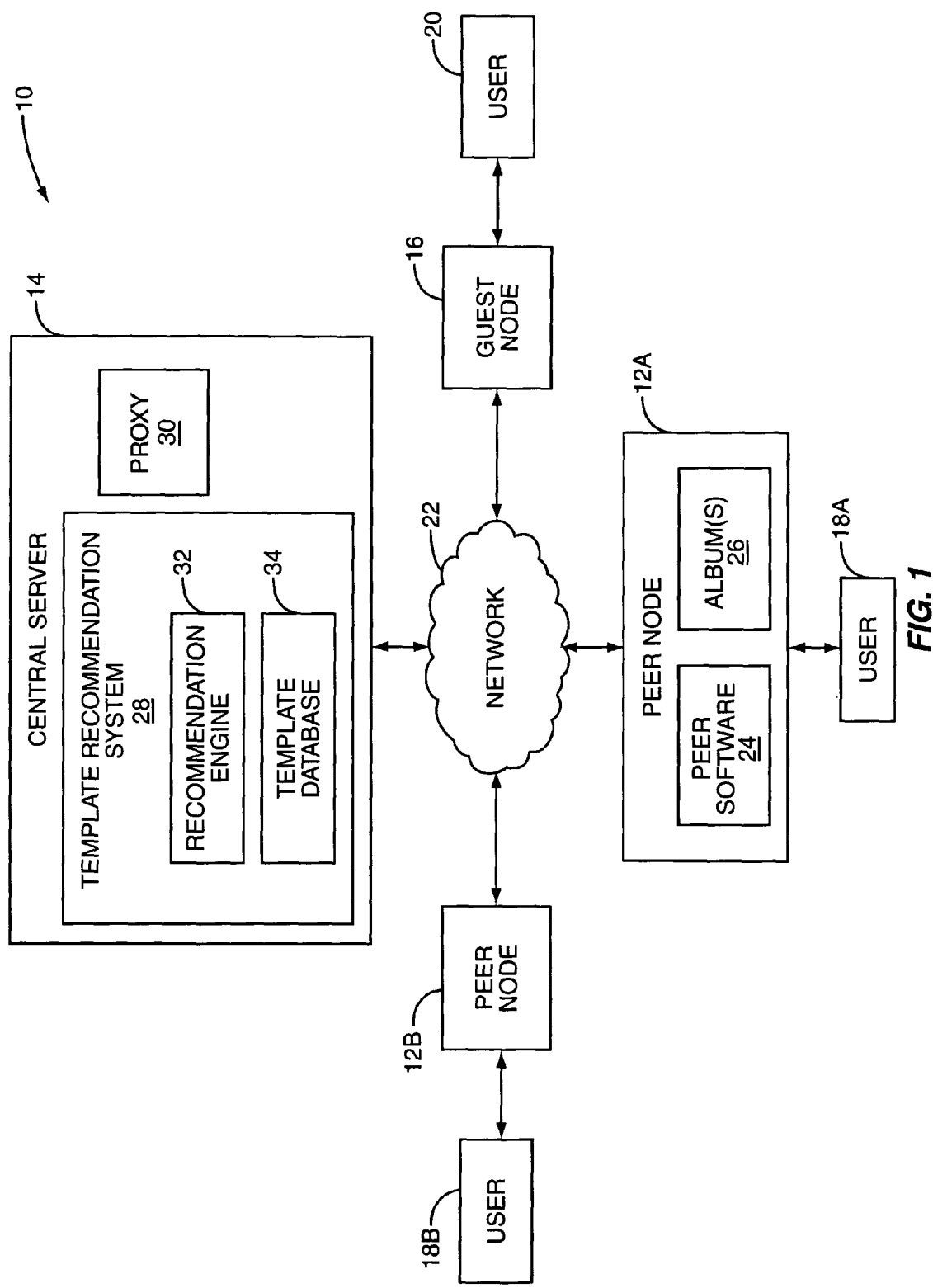
FIG. 1 is a basic block diagram of a peer-to-peer (P2P) photosharing system according to one embodiment of the present invention.

In another embodiment, the present invention may be implemented in a photosharing network where the digital images and/or the photo album are hosted on a central server. The template database may reside on the central server or on another central server that is accessible via a network. In a third embodiment, the present invention may be implemented in a peer-to-peer (P2P) photosharing system 10, as illustrated in FIG. 1. While the description below focuses on the P2P photosharing system 10, it should be understood that the present invention is not limited thereto and may be implemented on a single computer or on a central server hosting the photo album or the photo album and the digital images.

FIG. 1 illustrates an exemplary photosharing system 10 for sharing digital images, and optionally video. As illustrated, the photosharing system 10 is a peer-to-peer (P2P) system including peer nodes 12A and 12B, a central server 14, guest node 16, users 18A and 18B, user 20 associated with the guest node 16, and network (N/W) 22. Preferably, the network 20 is the Internet. Although the two peer nodes 12A and 12B and one guest node 16 are illustrated, there may be any number of peer nodes and guest nodes.

In general, each of the peer nodes 12A and 12B is a personal computer, mobile terminal, Personal Digital Assistant, or the like having access to the network 22. As illustrated, the peer node 12A includes peer software 24 and one or more photo albums 26. However, it should be noted that the discussion of peer node 12A is equally applicable to the peer node 12B. As discussed below in more detail, the peer software 24 enables the peer node 12A to create a photo album 26 using any number of digital images. After creating the photo album 26, the user 18A may instruct the peer software 24 to recommend templates to be used to customize the photo album 26. The recommended templates include template components such as, but not limited to, background, font, icons, graphic art, music, captions, and the like. In response to the request for recommended templates, the peer node 12A obtains metadata associated with the digital images in the photo album 26 and sends the metadata and a request for recommended templates to the central server 14.

It should be noted that the peer software 24 may be downloaded and installed on the peer node 12A from any type of computer readable media such as, but not limited to, a storage device of the central server 14, a storage device of another peer node or the guest node 16, an optical disk such as a compact disc (CD) or a Digital Video Disc (DVD), or the like. In addition, the peer software 24 may reside on the central server 14 and be downloaded to and installed on the peer node 12A.

The central server 14 includes a template recommendation system 28 and a proxy 30. The template recommendation system 28 includes a recommendation engine 32 and a template database 34. The recommendation engine 32 analyzes the metadata from the peer node 12A and selects one or more templates from the template database 34 to recommend for use with the photo album 26. The central server 14 then provides a preview of the one or more recommended templates back to the peer node 12A. Thus, the central server 14 operates to provide real-time template recommendations.

Once the peer node 12A receives the preview of the recommended templates, the user selects one of the recommended templates. The selection process may include displaying the preview of the recommended templates to the user. After selecting the desired template, the user may optionally be required to purchase the template or a license to use the template. Thereafter, the peer node 12A downloads the purchased template from the central server 14 and applies the template to the photo album 26.

The peer node 12A may then serve the photo album 26 and the template to a requesting party, such as the guest node 16 or another peer node, via the network 22. More specifically, the peer node 12A may operate as a web server and, preferably, provides the album 26 and template as a web page that is displayed in a web browser operating on either the guest node 16 or another peer node.

Figure 2:
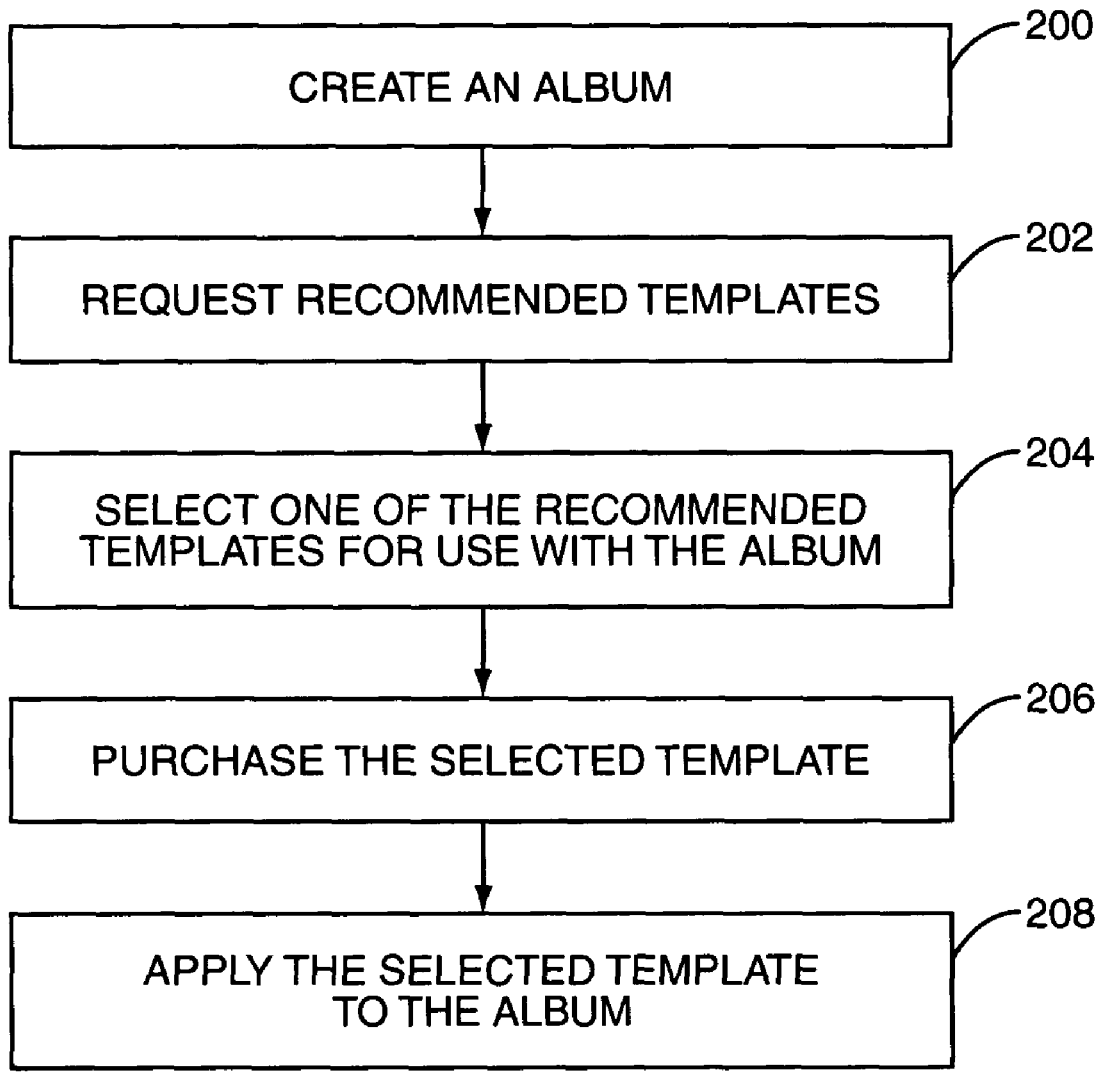
FIG. 2 illustrates a method of customizing an online photo album based on one or more recommended templates from the perspective of a user associated with a peer node in the P2P photosharing system of FIG. 1 according to one embodiment of the present invention.

FIG. 2 illustrates the recommendation process of the present invention from the perspective of the user 18A. First, the user creates the photo album 26 using the peer software 24 (step 200). In one embodiment, the user creates the photo album 26 by selecting one or more digital images to be included in the photo album 26 and optionally arranging the digital images within the photo album 26. Once the photo album 26 is created, the user requests recommended templates (step 202). As discussed below in more detail, the peer software 24 operates to obtain the recommended templates in real-time by gathering the metadata associated with the digital images in the photo album 26 and sending the metadata and a request for recommended templates to the central server 14. In response, the central server 14 provides a preview of recommended templates.

Once the user has received the preview of the recommended templates, the user selects one of the recommended templates for use with the photo album 26 (step 204). After selecting the desired template, the user may optionally be required to purchase the desired template or a license to use the desired template (step 206). For example, the user may be required to purchase a license to use the desired template for a preset period of time such as three days. As another example, the user may be required to purchase a license for unlimited use for one photo album or a number of photo albums. The user may also be given a choice as to what type of license he or she would like to purchase. After purchasing the desired template, the desired template is applied to the photo album (step 208).

Figure 3:
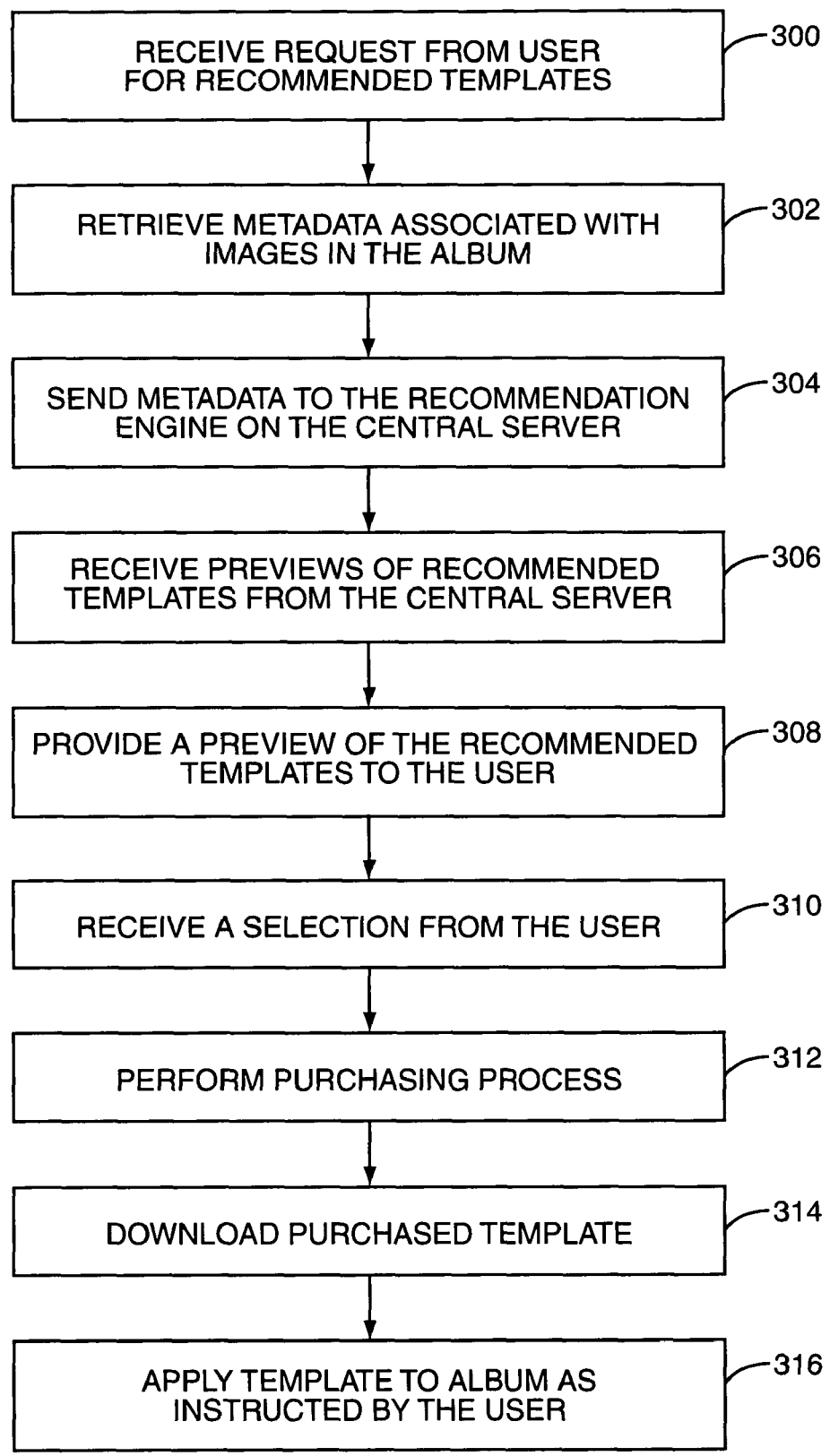
FIG. 3 illustrates a method for recommending templates for an online photo album and more specifically illustrates the operation of a peer node in requesting and receiving recommended templates from a central server according to one embodiment of the present invention.

FIG. 3 illustrates the operation of the peer node 12A in obtaining the recommended templates from the central server 14. The peer node 12A, and in particular the peer software 24, receives a request from the user 18A for recommended templates (step 300). Upon receiving the request, the peer software 24 retrieves metadata associated with the digital images in the photo album 26 (step 302). The metadata is data stored within or in association with the digital image file and may include various information about the digital image. For example, a digital camera used to capture the digital image may store information such as the date and time that the digital image was captured, the type of camera used to capture the digital image, orientation of the camera, resolution of the digital image, chromatics, light balance, flash status (on or off), ISO speed, shutter speed, exposure bias, subject distance, focal plane, self-timer, location from a Global Positioning System (GPS) receiver associated with the digital camera, and the like.

The peer software 24 then sends the metadata and a request for recommended templates to the central server 14 (step 304). More specifically, the metadata is sent to the recommendation engine 32 of the template recommendation system 28. As discussed below in more detail, the recommendation engine 32 analyzes the metadata to provide selection criteria. Using the selection criteria, the recommendation engine 32 selects the recommended templates. The peer node 12A then receives a preview of the recommended templates from the central server 14 (step 306), and provides the preview of the recommended templates to the user 18A (step 308). The peer software 24 then receives a selection from the user 18A indicating a desired one of the recommended templates (step 310). After receiving the selection from the user 18A, the peer software 24 may optionally perform a purchasing process during which the user 18A purchases the desired template or a license to use the desired template (step 312). Thereafter, the peer node 12A downloads the desired template from the central server 14 (step 314) and applies the template to the photo album 26 (step 316).

Figure 4:
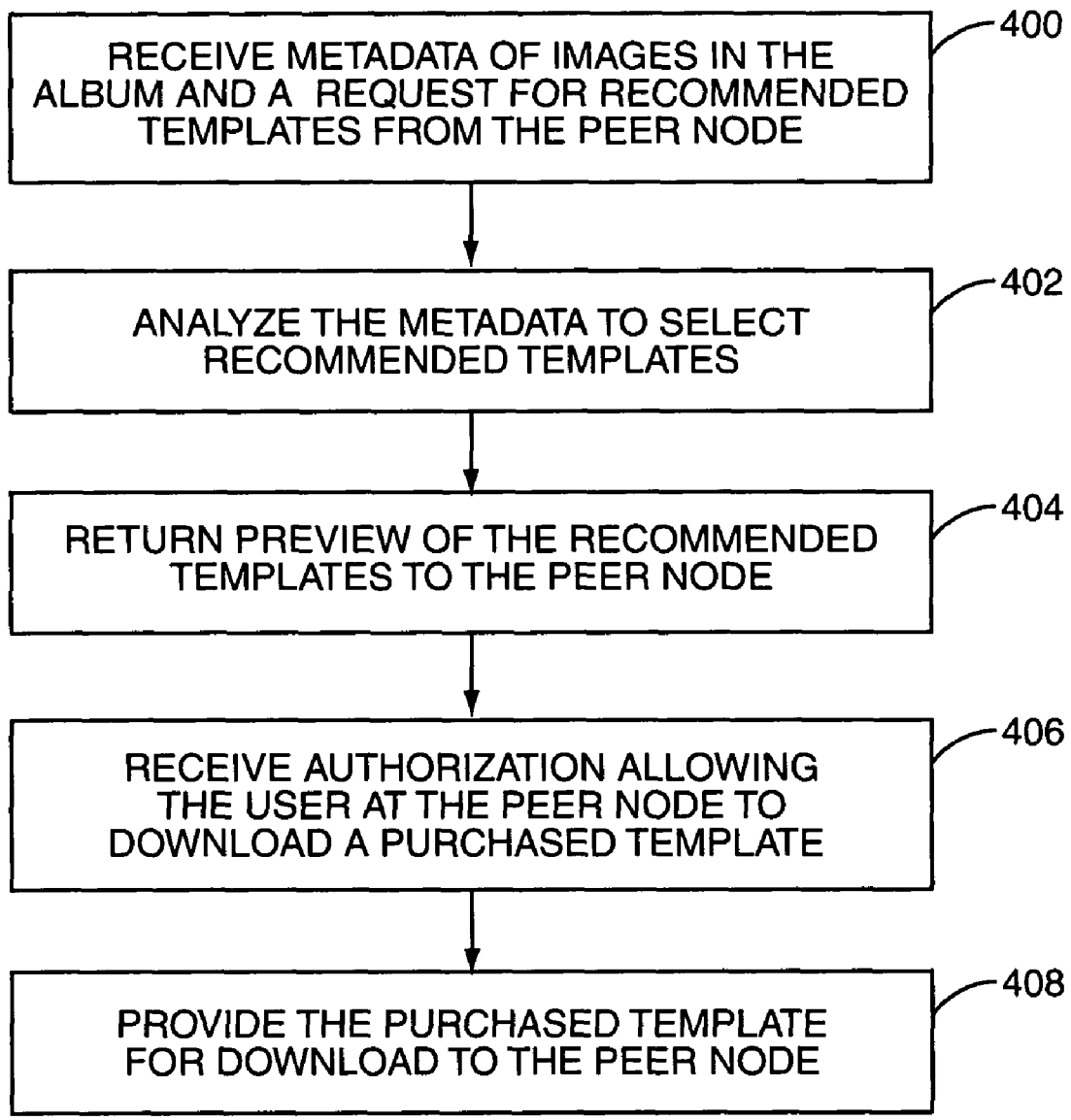
FIG. 4 illustrates a method of recommending templates for an online photo album based on metadata associated with digital images in the photo album according to one embodiment of the present invention.

FIG. 4 illustrates a method of providing the recommended templates to the peer node 12A. More specifically, FIG. 4 illustrates the operation of the recommendation engine 32 of the template recommendation system 28 of the central server 14. The recommendation engine 32 first receives the metadata associated with digital images in the photo album 26 and a request for recommended templates from the peer node 12A (step 400). Note that the recommended templates may be requested by simply providing the metadata to the recommendation engine 32 without an explicit request.

The recommendation engine 32 then analyzes the metadata and selects one or more templates from the template database 34 to recommend to the peer node 12A based on the analysis (step 402). More specifically, the recommendation engine 32 analyzes the metadata to provide selection criteria and selects one or more templates from the template database 34 to recommend to the peer node 12A based on the selection criteria. In one embodiment, the analysis is a statistical analysis, wherein the selection criteria may primarily be the mean, median, and/or mode of one or more variables within the metadata for all of the digital images. For example, if most of the digital images where captured after dark, then one or more predetermined templates may be recommended. If the mean flash setting is off, the mean ISO speed is low, and the mean shutter speed is high, then sports based templates, or some other type of action templates, may be recommended. If the median exposure bias is at a predetermined setting, then the recommendation engine 32 may determine that the digital images are still shots and recommend predetermined templates for still shots.

As another example, the selection criteria may be the dates and/or times of capturing the digital images or the mean, mode, or median date and/or time of capturing the digital images. For example, if the digital images were captured in December, one or more Christmas based templates may be recommended. Likewise, if the digital images are taken in February, then one or more Valentine's Day templates may be recommended. Also, if the digital images were all taken between 10 p.m. and 2 a.m., then one or more party templates may be recommended.

The recommendation engine 32 may also analyze the digital images by searching captions stored in the metadata by the user 18A for predetermined keywords, where the keywords found during the search are the selection criteria. The captions may be text or audio. For example, if the word "beach" or "ocean" is used numerous times in the captions, then the recommendation engine 32 may recommend one or more beach, tropical, or vacation themed templates.

The recommendation engine 32 may also analyze the digital images by searching for location information in the metadata from a GPS receiver or the like associated with the digital camera used to capture the digital images. In addition, the location information may be in terms of latitude and longitude. In this case, the recommendation engine 32 may convert the location information to a name or descriptor of the particular location. For example, the recommendation engine 32 may convert a latitude and longitude into a city name, such as New York, N.Y. The recommendation engine 32 may analyze the latitude and longitude information and determine that the pictures were taken at a beach or in a mountainous region. Further, since the date and time may also be known, the recommendation engine 32 may determine that the digital images were captured in Aspen, Colo. during January and recommend a snow skiing themed template.

In another embodiment, the recommendation engine 32 may operate as an inference engine. More specifically, the recommendation engine 32 may analyze the metadata and make inferences as to what types of templates the user 18A may desire based on historical data including past selections by the user 18A and/or other users. The recommendation engine 32 may examine the metadata and recommend templates by recommending the templates selected by users whose images have had similar metadata. For example, the recommendation engine 32 may analyze the metadata to determine that the mean ISO speed is X, the mean aperture value is Y, and the mean shutter speed is Z. The recommendation engine 32 may then recommend the templates selected by past users whose metadata indicated a mean ISO speed of X, a mean aperture value of Y, and a mean shutter speed of Z.

After analyzing the metadata and selecting one or more templates to recommend based on the analysis of the metadata, the recommendation engine 32 of the central server 14 returns a preview of the recommended templates to the peer node 12A (step 404). As discussed above, the user 18A then selects a desired one of the recommended templates and optionally purchases the desired template or a license to use the desired template. Once selection and purchase is complete, the central server 14 may receive authorization from a commerce server associated with the purchasing transaction authorizing the user 18A at the peer node 12A to download the purchased template (step 406). In essence, the authorization indicates the user 18A at the peer node 12A is permitted to download the purchased template. Thereafter, the central server 14 provides the purchased template for download by the peer node 12A (step 408).

Figure 5:
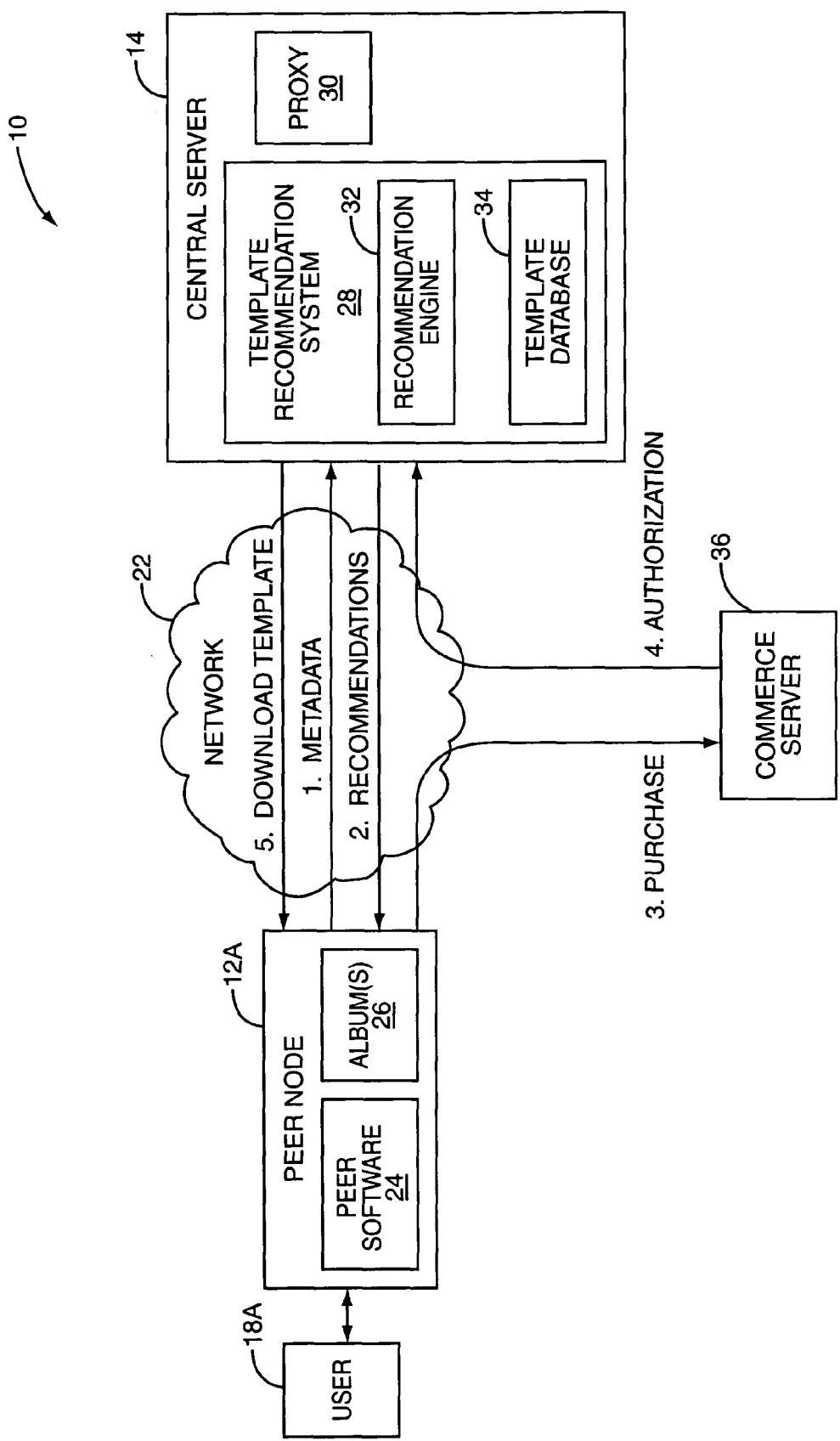
FIG. 5 is a basic block diagram illustrating the processing of recommending templates for an online photo album according to one embodiment of the present invention.

FIG. 5 is a basic system diagram illustrating the entire recommendation process. After the peer software 24 of the peer node 12A receives a request from the user 18A for recommended templates for the photo album 26, the peer software 24 gathers the metadata associated with the digital images in the photo album 26 and sends the metadata to the central server 14 via the network 22. In particular, the metadata is provided to the recommendation engine 32 of the template recommendation system 28. Thereafter, the recommendation engine 32 analyzes the metadata and selects templates from the template database 34 to recommend to the peer node 12A. The central server 14 then provides a preview of the recommended templates to the peer node 12A. The user then selects a desired one of the recommended templates. If purchase is required, the peer node 12A obtains purchasing information, such as billing information, credit card number, and the like, from the user 18A and sends the purchasing information to a commerce server 36. Optionally, the user's purchasing information may be stored by the peer software 24 prior to conducting the transaction such that the user 18A is not required to reenter the purchasing information. Once the purchase is complete, the commerce server 36 send authorization to the central server 14 indicating that the user 18A at the peer node 12A is now permitted to download the purchased template. Thereafter, the peer node 12A downloads the purchased template from the central server 14. Alternatively, the central server 14 may push the purchased template to the peer node 12A upon receiving authorization.

Once the peer node 12A has received the purchased template, the peer software 24 operates to apply the purchased template to the photo album 26. In one embodiment, the purchased template is downloaded as a zipped file, such as a zip file produced by WINZIP® compression software, and may include a flash application, which may also be referred to as a flash plug-in, and template components such as, but not limited to, a background, captions, fonts, icons, clip art, music, and the like. In an alternative embodiment, music may be recommended independently from the template such that different types of music may be recommended in connection with each template. The peer software 24 may include a builder component that uses the flash application and the template components to build, or customize, the photo album 26. The peer software 24 may automatically apply the purchased template to the photo album 26. Alternatively, the peer software 24 may interact with the user 18 to receive instructions defining how the purchased template is to be applied to the photo album 26. In either case, the peer software 24 may allow the user 18A to edit the photo album 26 after the purchased template is applied. For example, the peer software 24 may allow the user to add or edit captions, edit the digital images (cropping, red-eye reduction, and the like), edit the position or arrangement of the digital images in the photo album 26, and/or add or remove images from the photo album.

Figure 6:
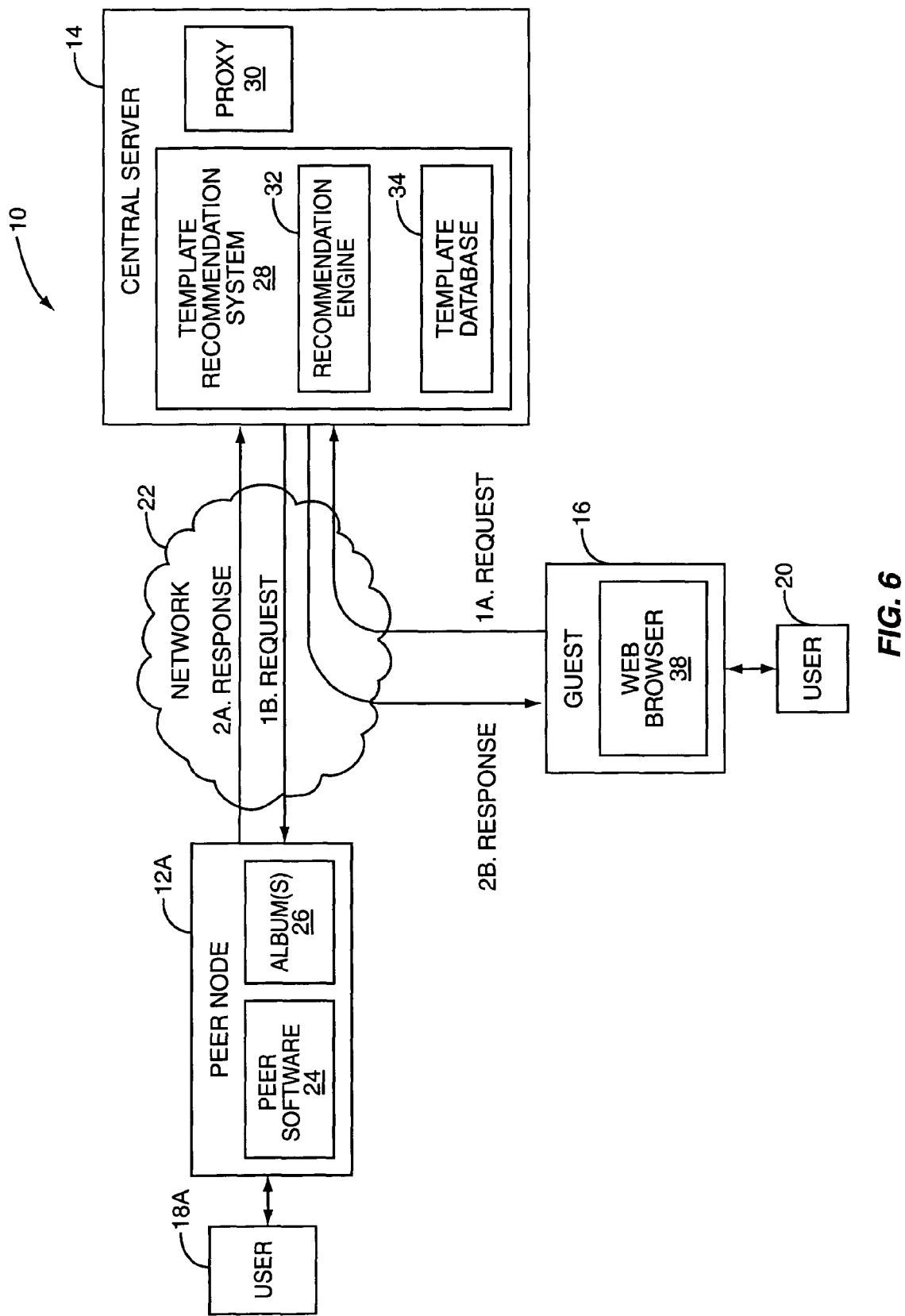
FIG. 6 is a basic block diagram illustrating the process of serving a photo album and template to a guest according to one embodiment of the present invention.
Figure 7:
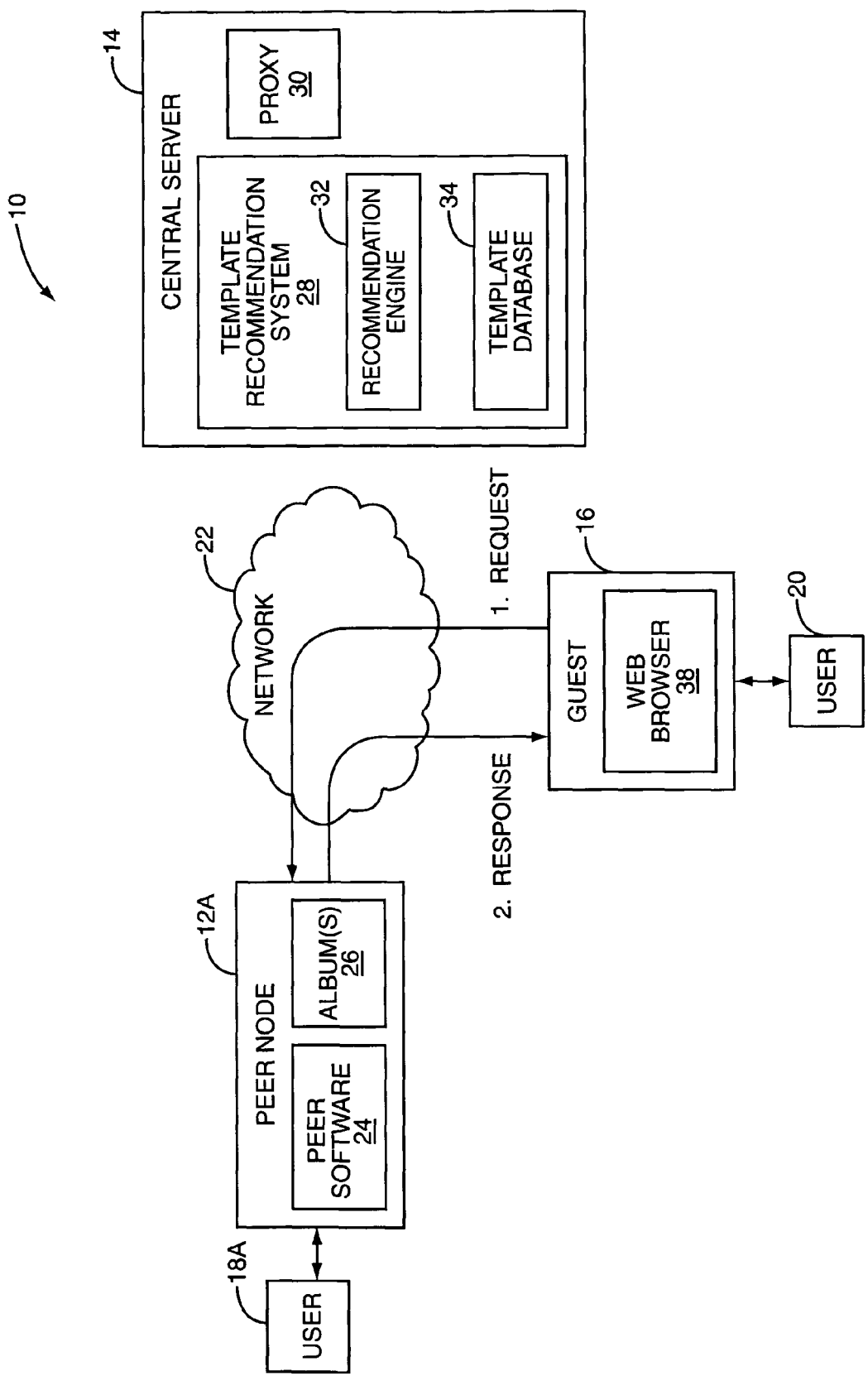
FIG. 7 is a basic block diagram illustrating the process of serving a photo album and template to a guest according to another embodiment of the present invention.
Figure 8:
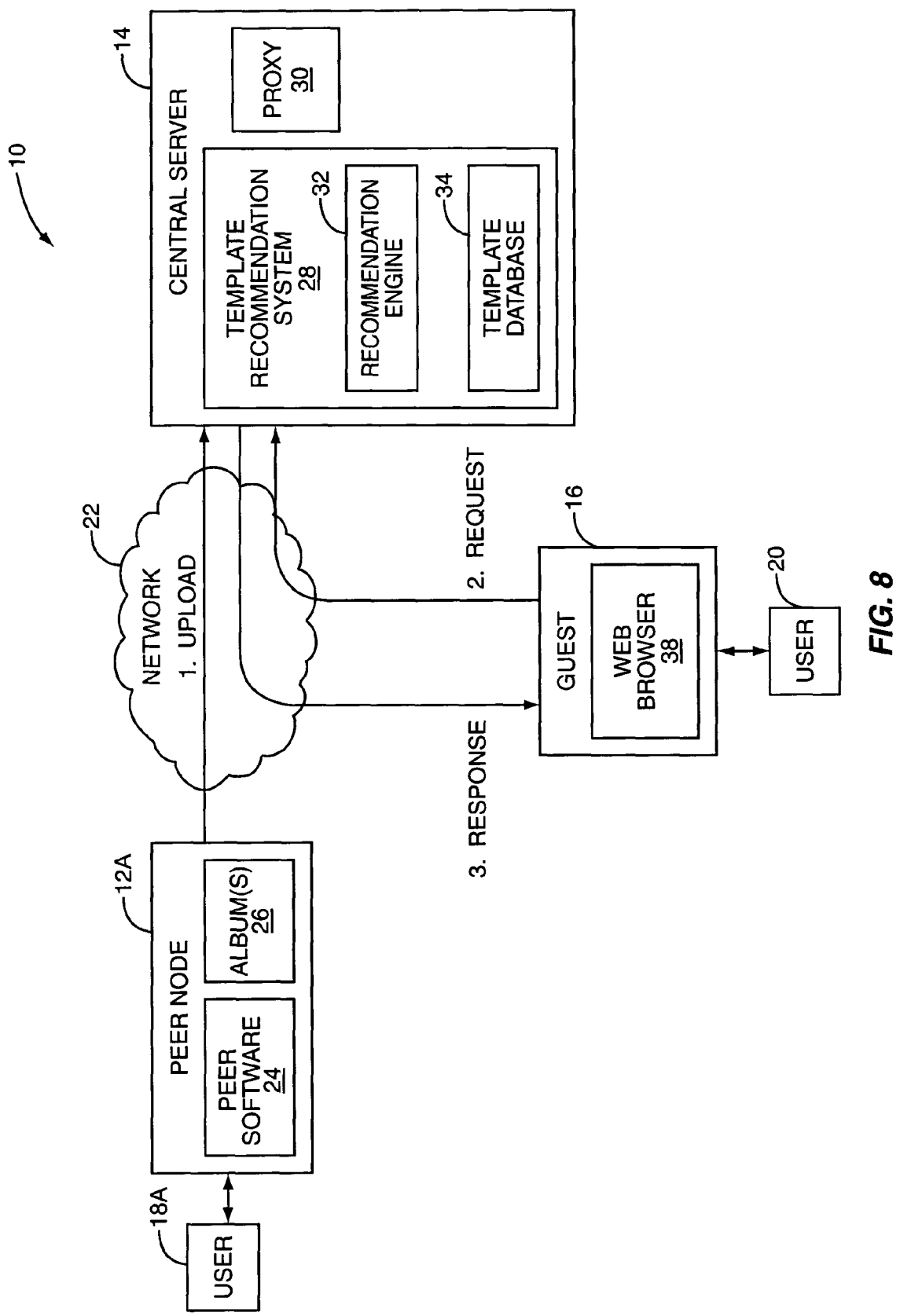
FIG. 8 is a basic block diagram illustrating the process of serving a photo album and template to a guest according to yet another embodiment of the present invention.

After customization of the photo album 26 using the purchased template, the user 18A may desire to share the photo album 26 with other users or guests via the network 22. FIGS. 6-8 illustrates three alternative embodiments for sharing the photo album 26. FIG. 6 illustrates a first embodiment where the central server 14, and specifically the proxy 30, operates to direct traffic between the peer node 12A and the guest node 16. It should be noted that the guest node 16 may alternatively be another peer node. Also, in order to share the photo album 26 the user 18A may send invitations to other users via e-mail. The invitation may include a web address of the photo album, and optionally a password. Alternatively, the user 18A may interact with the peer software 24 to indicate which other users have permission to view the photo album 26.

In this embodiment, the user 20 at the guest node 16 sends a request for the photo album 26. More specifically, in one embodiment, the user 20 opens a web browser 38 on the guest node 16 and enters a web address associated with the photo album 26. The guest node 16 sends the request to the proxy 30 at the central server 14. The proxy 30 directs the request to the peer node 12A. Upon receiving the request, the peer node 12A, and particularly the peer software 24, operates as a web server and serves the album 26 having been customized with the purchased template to the proxy 30. Note that serving the album 26 also includes serving the template components, such as the background, captions, fonts, icons, clip art, music, and the like. The proxy 30 then directs the album 26 including the template components to the web browser 38 at the guest node 16. The web browser 38 displays the photo album 26, which is customized by the purchased template, to the user 20. Optionally, the user 20 at the guest node may be permitted to select digital images in the photo album 26 and download full resolution versions of the selected digital images from the peer node 12A in a similar fashion.

FIG. 7 illustrates another embodiment of a system and method for sharing the photo album 26. This embodiment is similar to that of FIG. 6. However, in this embodiment, the peer node 12A shares the photo album 26 in a pure P2P fashion. More specifically, rather than routing the request from the guest node 16 through the proxy 30 of the central server 14, the request is provided directly to the peer node 12A via the network 22. In response, the peer software 24 operates as a web server and serves the photo album 26 and the template components directly to the guest node 16.

FIG. 8 illustrates yet another embodiment of a system and method for sharing the photo album 26. In this embodiment, the peer node 12A operates to push or upload the photo album 26 including the template components to the central server 14 prior to a request from the guest node 18. More specifically, after customizing the photo album 26 using the purchased template, the peer node 12A uploads the photo album 26 and template components to the central server 14. This may automatically be done by the peer software 24. Alternatively, the user 18A may instruct the peer software 24 to upload the photo album 26 and template components to the central server 14. In one embodiment, the peer software 24 may only upload the photo album 26. Since the template components are already stored on the central server 14 in the template database 34, the peer software 24 may only need to indicate which template components should be included and their positions in the photo album 26 in order to reduce the amount of information that needs to be uploaded, which reduces the amount of time required for the upload. This may especially be beneficial where one of the template components is a large file, such as a music file.

After the photo album 26 and optionally the template components are uploaded to the central server 14, the guest node 36 sends a request for the photo album 26 to the central server 14. The central server 14, rather than the peer node 12A, operates as a web server and serves the photo album 26 including the template components to the guest node 16. The guest node 16 then displays the photo album 26 to the user 20 via the web browser 38.

Figure 9:
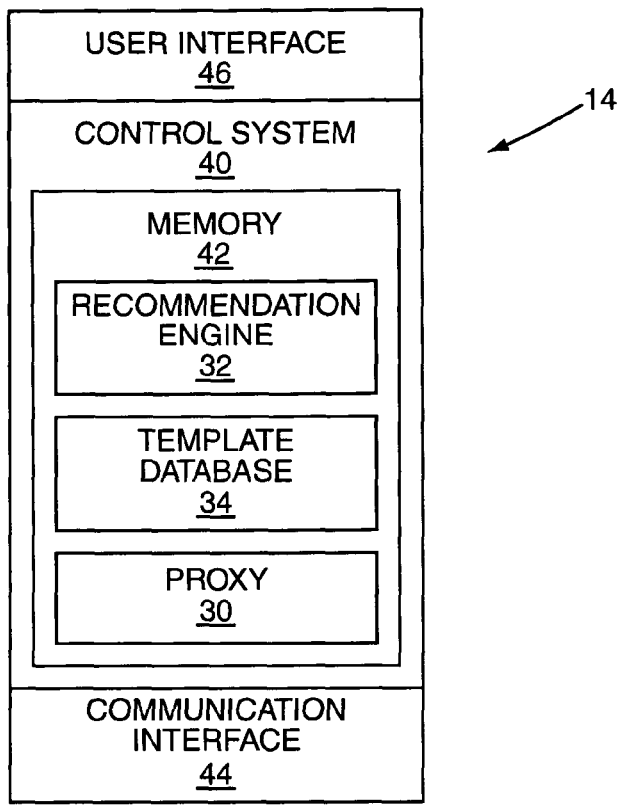
FIG. 9 is a basic system diagram of an exemplary embodiment of the central server.

FIG. 9 illustrates a basic block diagram of an exemplary embodiment of the central server 14. The central server 14 may generally include a control system 40 having associated memory 42. The memory 42 may store software corresponding to the recommendation engine 32, the template database 34, and software corresponding to the proxy 30. Note that the template database 34 may be a separate storage device, such as a hard drive, associated with the central server 14. In addition, the proxy 30 may be implemented in hardware such that there is a separate proxy control system having memory storing proxy software. The central server 14 may also include a communication interface 44 for communicating with other network entities via the network 22. The communication interface 44 may include an interface to various external devices. A user interface 46 may also be provided and include a keypad and a mouse (not shown).

Figure 10:
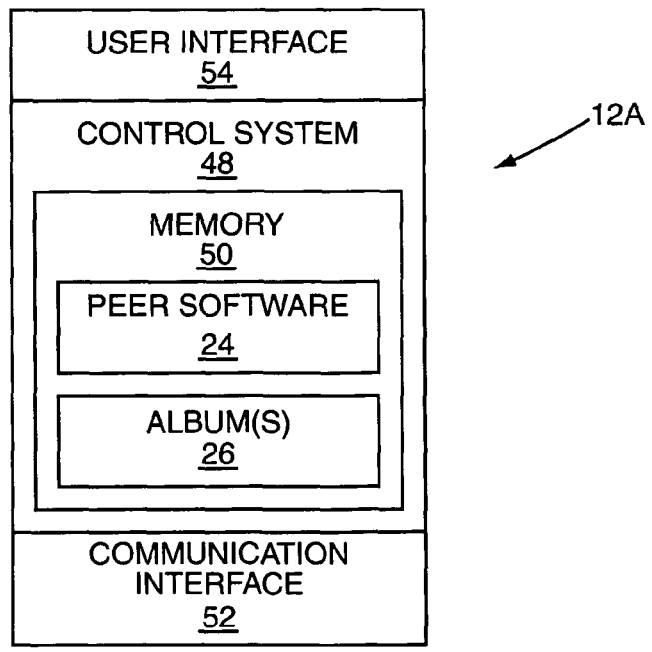
FIG. 10 is a basic system diagram of an exemplary embodiment of the peer node.

FIG. 10 illustrates a basic block diagram of an exemplary embodiment of the peer node 12A. The peer node 12A may generally include a control system 48 having associated memory 50. The memory 50 may store the peer software 24 and the one or more albums 26. The peer node 12A may also include a communication interface 52 for communicating with other network entities via the network 22. The communication interface 52 may include an interface to various external devices such as a printer. A user interface 54 may also be provided and include a keypad and a mouse (not shown).

The present invention provides substantial opportunity for variation without departing from the spirit or scope of the present invention. For example, while the recommendation process has been described above with respect to a peer-to-peer photosharing system, the recommendation process may be used in any type of photosharing system. More specifically, the recommendation process is equally applicable to an online photosharing system where the photo album 26 is stored on the central server 14 rather than the peer node 12A. In this alternative embodiment, the recommendation engine 32 may obtain the metadata associated with the digital images in the photo album 26 locally rather than from the peer node 12A. Then, the recommendation engine 32 may send a preview of recommended templates to a user at a remote node via the network 22. The user at the remote node may then select a desired template, optionally purchase the desired template, and apply the desired template to the photo album 26 stored on the central server 14.

As another example, the recommendation process may also be used on a single computer. In this alternative embodiment, software on the single computer may combine the functionality of the template recommendation system 28 and the peer software 24. More specifically, the software on the single computer may create an album 26. A user may then request recommended templates. The software on the single computer may then obtain metadata associated with digital images included in the photo album 26, analyze the metadata locally, select templates to recommended from a local template database 34 or a remote template database 34, and provide a preview of the recommended templates to the user. The user may then select a desired one of the recommended templates, optionally purchase the desired template, and apply the desired template to the photo album 26.

Those skilled in the art will recognize improvements and modifications to the preferred embodiments of the present invention. All such improvements and modifications are considered within the scope of the concepts disclosed herein and the claims that follow.

What is claimed is:

1. A central node for recommending customized templates for an electronic photo album comprising:
   memory;
   a control system associated with the memory and adapted to:
      analyze metadata associated with digital images selected to be included in a photo album to determine selection criteria where the metadata includes values that are set during capture of the digital images;
      select a number of templates to provide at least one recommended template that includes a recommended background, a recommended caption, and recommended graphic art, wherein the recommendations are made based on the selection criteria that includes the values that are set during the capture of the digital images;
      present preview of at least one of the number of templates including the at least one recommended template to a user at a client node;
      receive a selected template from the client node, wherein the user at the client node purchases the selected template from the number of templates; and
      provide the selected template to the client node for application to the photo album at the client node.

2. The central node of claim 1 wherein the control system is further adapted to analyze the metadata by performing a statistical analysis of the metadata to determine the selection criteria.

3. The central node of claim 2 wherein the selection criteria comprise a mean, mode, or median of a variable in the metadata, wherein the metadata includes a value of the variable for each of the digital images in the photo album.

4. The central node of claim 1 wherein the selection criteria comprise dates upon which the digital images were captured.

5. The central node of claim 1 wherein the selection criteria comprise times at which the digital images were captured.

6. The central node of claim 1 wherein the selection criteria comprise a location at which the digital images were captured.

7. The central node of claim 1 wherein the control system is further adapted to analyze the metadata by searching captions associated with the digital images stored in the metadata for predetermined keywords such that the selection criteria comprise keyword search results.

8. The central node of claim 7, wherein the captions include audio, where the selection is made based on the audio of the captions.

9. The central node of claim 1 wherein the control system comprises an inference engine adapted to analyze the metadata based on historical data.

10. The central node of claim 1 wherein the central node is coupled to a network and the metadata is provided from the client node to the central server via the network.

11. The central node of claim 10 wherein the digital images are stored at the client node, and the client node obtains the metadata from the digital images and provides the metadata, rather than the digital images, to the central node.

12. The central node of claim 10 wherein the control system is further adapted to provide a preview of the at least one recommended template to the client node via the network.

13. The central node of claim 12 wherein the at least one recommended template is selected and purchased as a desired template for the photo album and the control system is further adapted to receive authorization from a commerce server permitting the client node to obtain the desired template.

14. The central node of claim 12 wherein the client node is a peer node in a peer-to-peer photosharing network and the control system is further adapted to:
   receive a request for the photo album via the network from a requesting party;
   request the photo album from the client node via the network;
   receive the photo album including template components of the desired template from the client node; and
   provide the photo album including the template components to the requesting party.

15. The central node of claim 1 wherein the at least one recommended template includes a plurality of template components selected from the group consisting of: fonts, icons, clip art, and music.

16. The central node of claim 1 wherein the digital images are stored in the memory associated with the control system, and the control system is further adapted to obtain the metadata from the digital images.

17. The central node of claim 16 wherein the control system is coupled to a network and the digital images are provided to the central node from the client node via the network.

18. The central node of claim 1 wherein a value for a flash selling is set during capture of the digital images such that the value of the flash setting is used to select the number of templates.

19. The central node of claim 1 wherein a value for an ISO speed is set during capture of the digital images such that the value of the ISO speed is used to select the number of templates.

20. The central node of claim 1 wherein a value for a shutter speed is set during capture of the digital images such that the value of the shutter speed is used to select the number of templates.

21. A computer readable media storing software for instructing a computer to:
   select a plurality of digital images to be included in a photo album;
   provide metadata associated with the plurality of digital images to a central server via a network where the metadata includes values that are set during capture of the plurality of digital images;
   receive a preview of a number of recommended templates that includes a recommended background, a recommended caption, and recommended graphic art for the photo album from the central server via the network, wherein the central server selects the number of recommended templates from a number of templates based on the values that are set during the capture of the plurality of digital images;
   select a template from the number of recommended templates;
   purchase the selected template:
   obtain the selected template from the central server; and
   apply the selected template to the photo album.

22. The computer readable media of claim 21 wherein the software is further adapted to instruct the computer to provide the photo album including template components of the selected template to the central server in response to a request for the photo album, wherein the central server operates as a proxy server in directing the request from a requesting node to the computer and directing the photo album and the template components from the computer to the requesting node.

23. The computer readable media of claim 21 wherein the software is further adapted to instruct the computer to:
   receive a request for the photo album from a requesting party via the network; and
   provide the photo album including template components of the selected template to the requesting party via the network in response to the request.

24. The computer readable media of claim 21 wherein the software is further adapted to instruct the computer to:
   upload the photo album to the central server;
   wherein the central server provides the photo album including template components of the selected template to a requesting party via the network in response to a request for the photo album from the requesting party.

25. The computer readable media of claim 21 wherein the software is further adapted to instruct the computer to:
   conduct a purchasing transaction to purchase the selected template; and
   obtain the selected template once the purchasing transaction is complete.

26. The computer readable media of claim 21 wherein a value for a flash setting is set during capture of the digital images such that the value of the flash setting is used to select the number of recommended templates.

27. The computer readable media of claim 21 wherein a value for an ISO speed is set during capture of the digital images such that the value of the ISO speed is used to select the number of recommended templates.

28. The computer readable media of claim 21 wherein a value for a shutter speed is set during capture of the digital images such that the value of the shutter speed is used to select the number of recommended templates.

29. A method of recommending templates for a photo album comprising, at a computing device:
   analyzing metadata associated with digital images selected to be included in the photo album to provide selection criteria where the metadata includes values that are set by a capture device during capture of the digital images;
   selecting a number of templates to provide at least one recommended template that includes a recommended background, a recommended caption, and recommended graphic art, wherein the recommendations are made based on the selection criteria that include the values that are set during the capture of the digital images;
   presenting preview of at least one of the number of templates including the at least one recommended template to a user at a client node:
   receiving a selected template from the client node, wherein the user at the client node purchases the selected template from the number of templates; and
   providing the selected template to the client node for application to the photo album at the client node.

* * * * *

UNITED STATES PATENT AND TRADEMARK OFFICE
CERTIFICATE OF CORRECTION

| | | |
|---|---|---|
| PATENT NO. | : 7,715,586 B2 | Page 1 of 1 |
| APPLICATION NO. | : 11/201594 | |
| DATED | : May 11, 2010 | |
| INVENTOR(S) | : Issa et al. | |

It is certified that error appears in the above-identified patent and that said Letters Patent is hereby corrected as shown below:

In column 11, at line 9, replace "12" with --13--.

Signed and Sealed this
Fourth Day of October, 2011

David J. Kappos
*Director of the United States Patent and Trademark Office*